United States Patent
Ramesohl et al.

(10) Patent No.: US 6,254,382 B1
(45) Date of Patent: Jul. 3, 2001

(54) METHOD AND APPARATUS FOR THERMAL TREATMENT OF MEALY RAW MATERIALS

(75) Inventors: Hubert Ramesohl, Bergisch Gladbach; Michael Brachthäuser, Dormagen; Andreas Hand, Köln; Stephan Kuhnke, Erftstadt, all of (DE)

(73) Assignee: KHD Humboldt Wedag AG (DE)

( * ) Notice: Subject to any disclaimer, the term of this patent is extended or adjusted under 35 U.S.C. 154(b) by 0 days.

(21) Appl. No.: 09/444,130

(22) Filed: Nov. 19, 1999

(30) Foreign Application Priority Data

Nov. 25, 1998 (DE) .............................................. 198 54 582

(51) Int. Cl.$^7$ ........................................................ F27B 15/00
(52) U.S. Cl. ............................... 432/14; 432/58; 432/106
(58) Field of Search ....................... 432/14, 106, 58, 432/105

(56) References Cited

U.S. PATENT DOCUMENTS

| | | | |
|---|---|---|---|
| 4,747,879 | * | 5/1988 | Wolter et al. ........................... 432/14 |
| 5,098,285 | * | 3/1992 | Bauer ..................................... 432/14 |
| 5,292,247 | * | 3/1994 | Bauer ..................................... 432/58 |
| 5,713,734 | * | 2/1998 | Makris et al. ......................... 432/106 |

FOREIGN PATENT DOCUMENTS

| | | |
|---|---|---|
| 0 222 044 B1 | 3/1989 | (EP) . |
| 0 526 770 B1 | 7/1995 | (EP) . |

\* cited by examiner

*Primary Examiner*—Jiping Lu
(74) *Attorney, Agent, or Firm*—Sonnenschein Nath & Rosenthal

(57) ABSTRACT

In order to create, for cement clinker production lines, a calcinator that is connected upstream from the rotary tubular kiln and is equipped with two firings, which enables on the one hand a high-grade calcinated raw meal and on the other hand an exhaust gas with very low $NO_x$ emissions, as well as a burning that is as complete as possible of remaining CO-containing $NO_x$ reduction zones, it is provided that a combustion point with sub-stoichiometric fuel combustion be arranged both in the rotary kiln exhaust gas ascending line and also in the cooler outgoing air line which form a first and section portion, respectively, of the calcinator and that downstream in a flow direction of the suspension, additional combustion air discharges into the calcinator which combustion air is branched off from the tertiary air line coming from the clinker cooler via at least one branch line.

6 Claims, 1 Drawing Sheet

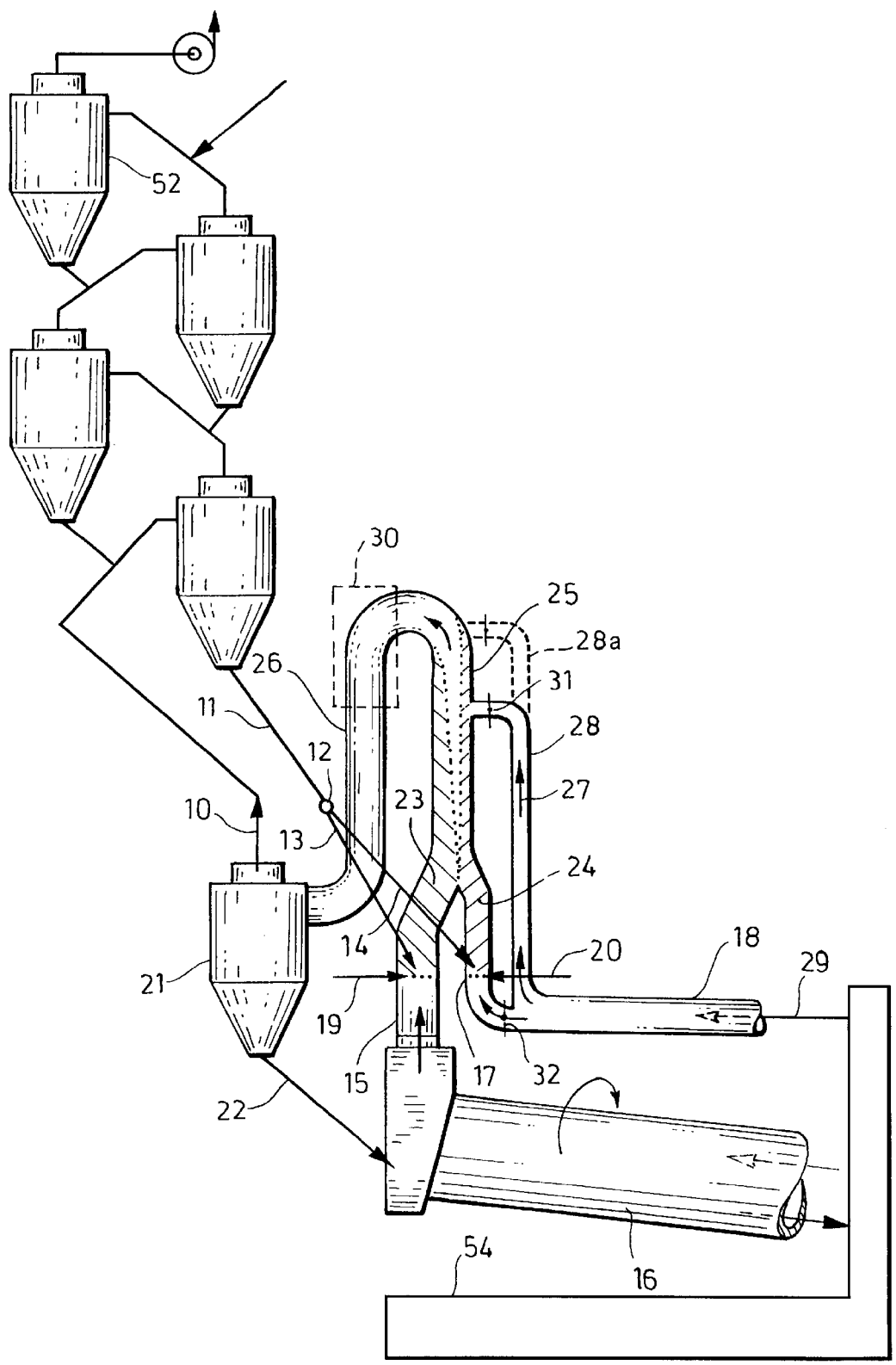

METHOD AND APPARATUS FOR THERMAL TREATMENT OF MEALY RAW MATERIALS

BACKGROUND OF THE INVENTION

The invention relates to a method for the thermal treatment of mealy raw materials, in particular in the manufacturing of cement clinkers from raw meal, whereby the raw meal is treated thermally in a burning process by means of pre-heating, calcination, sintering and cooling, and the exhaust gas flow from the sintering stage (rotary kiln) and an outgoing air stream (tertiary air) of the cooling stage (clinker cooler) are used in the calcination stage, supplied with fuel, for the calcination of the raw meal, whereby the gas-solid material suspension is diverted in the calcination stage, and is introduced into the lowest cyclone of the cyclone suspension gas pre-heater system in order to separate the calcinated raw meal from the gas stream. In addition, the invention relates to an apparatus for the execution of the method.

In installations for the manufacture of cement clinkers from cement raw meal, in order to avoid rotary tubular kilns that are uneconomically long and/or large in diameter, and in order to keep the specific heat requirement of the cement clinker manufacturing process low, it is known to connect a calcinator or, respectively, a calcination stage, upstream from the rotary tubular kiln, seen from the material flow side, the calcinator or, respectively, calcination stage, being equipped with a second firing (in addition to the firing in the rotary tubular kiln). A calcinator is known in which an ascending pipeline branch that is supplied with fuel and that conducts the gas-solid material suspension is diverted 180° into a descending pipeline branch (e.g. EP-B-0 222 044; also EP-B-0 526 770). The fuel, of whatever sort (for example, coal dust), that is introduced into the calcination stage is combusted as completely as possible with hot outgoing air (called tertiary air) coming from the clinker cooler; that is, it is combusted with an excess of oxygen, in particular in the tertiary air line itself. The combustion heat that arises is transferred immediately to the raw meal, and is used for the calcination of the raw meal before introduction into the rotary tubular kiln, whereby the temperature does not increase significantly beyond the dissociation temperature of the de-carbonatization reaction. Today, efforts are being made to burn up to about 65% of the total fuel required for a cement clinker production line in the calcinator connected upstream from the rotary tubular kiln, and to burn only the remaining 35% of the fuel in the rotary tubular kiln itself. That is, in modern installations the fuel is thus used predominantly in the calcinator, because the specific heat requirement or, respectively, heat consumption in the calcinator, at the level of approx. 550 kcal per kg of de-acidified raw meal for the execution of the endothermic calcination (de-acidification) reaction, is higher than the heat requirement still occurring in the rotary tubular kiln connected downstream. What is concerned is thus a calcination that is as complete as possible of the raw meal in the calcination stage connected upstream from the rotary tubular kiln.

In the calcinator of the two references cited above, the rotary kiln exhaust gas is combined with the tertiary air coming from the clinker cooler. Before the combination, in the rotary kiln ascending exhaust gas pipeline, fuel is burned sub-stoichiometrically, i.e., with a deficiency of oxygen, for the purpose of creating a reduction zone that contains CO, or, respectively, a strand of CO for the reduction of the harmful substance $NO_x$, which is formed in particular by the high-temperature combustion in the rotary tubular kiln (thermal $NO_x$), while in the adjacent tertiary air duct fuel is burned super stoichiometrically, i.e., with an excess of oxygen. Seen opposite the flow of the suspension, the CO not consumed in the $NO_x$ reduction zone is then burned using excess oxygen from the tertiary air duct, whereby the burning of this remainder is favored by the 180° angle in the pipeline, or, respectively, in the known specific construction, by a turbulence chamber or, respectively, mixing chamber arranged in the area of the pipeline angle.

Using the technologies described above, the $NO_x$ emissions of cement clinker burning installations can be reduced very significantly. However, there are cases of application in which a further reduction of $NO_x$ is desirable, in particular also a reduction of the fuel $NO_x$ that arises in the calcination stage during the combustion of the fuel in the tertiary air duct, formed by the nitrogen that is chemically bound in the fuel.

SUMMARY OF THE INVENTION

The invention is based on the object of creating, in cement clinker production lines of the type named above, a calcinator that is connected upstream from the rotary tubular kiln and is equipped with two firings, which enables on the one hand a high-grade calcinated raw meal and on the other hand an exhaust gas having an even further reduced $NO_x$ content, as well as a burning that is as complete as possible of remainders from CO gas strands, and also of other fuel components.

It is characteristic for the inventive calcination stage or, respectively, the calcinator that both the fuel introduced into the rotary kiln exhaust gas line and also the fuel introduced into the cooler outgoing air line (tertiary air duct) is burned sub-stoichiometrically, i.e. with a deficiency of oxygen, for the purpose of forming a respective CO-containing reduction zone (CO strand) for $NO_x$ reduction both in the rotary kiln exhaust gas line and in the tertiary air duct. In other words, both in the rotary kiln exhaust gas duct and in the tertiary air duct there is at least one combustion point such that there is a strong excess of CO in the calcination stage, whereby the $NO_x$ content in the calcinator exhaust gas, as well as in the exhaust gas of the overall cement clinker production line, can be further lowered. In order to avoid emissions of CO here, in the calcinator—regarded downstream from the flow of the suspension—in the calcination stage itself, combustion air is introduced into the gas-solid material suspension for the burning of the remainder of the CO strands. According to a particular feature of the invention, this combustion air for the afterburning of the CO strands coming from the reduction zone, as well as, if warranted, other fuel components, is branched off from the tertiary air, which supplies the combustion point located in the calcination stage in the tertiary air duct with oxygen. The quantity of branched-off tertiary air can be approximately 10 to 50% of the overall tertiary air supplied to the calcination stage.

According to a particular feature of the invention, the air ratio $\lambda$ for the sub-stoichiometric fuel combustion in the rotary kiln exhaust gas duct is smaller than in the tertiary air duct; i.e., in the first-named combustion point it can lie in a range from approximately 0.1 to 0.7, and in the second-named combustion point it can lie in a range from approximately 0.5 to 1.0.

In a cement clinker production line, the invention enables an effective further lowering of the $NO_x$ contained in the exhaust gas from the firing of the rotary tubular kiln (here mainly thermal $NO_x$) and from the firing of the calcinator (here mainly fuel $NO_x$), with simultaneous creation of high-quality (e.g. greater than 90%) calcinated cement raw meal before entry into the rotary tubular kiln.

The invention, and its additional features and advantages, are explained in more detail on the basis of the exemplary embodiment shown schematically in the drawing.

BRIEF DESCRIPTION OF THE DRAWINGS

The FIGURE is a schematic illustration of the location calcination stage of the method in the calcinator.

DETAILED DESCRIPTION OF THE PREFERRED EMBODIMENTS

The drawing shows a schematic view of the calcination stage or, respectively, the calcinator of an installation for manufacturing cement clinkers from cement raw meal. The cement raw meal is presented at the top to a cyclone suspension gas pre-heating system, where it travels successively through several cyclone suspension gas heat exchangers in a combined co-current flow and counter-flow to the hot exhaust gas 10 of the calcination stage, and is separated out from the gas stream 10 in the next-to-last (second from the bottom) cyclone 50, and is partitioned to the two material supply pipelines 13 and 14 through the supply line 11 in the raw meal shunt 12. After flowing through the uppermost cyclone 52, the exhaust gas 10, cooled by the cement raw meal, leaves the pre-heating stage of the cement clinker production line. Although the entire system is not illustrated in detail, U.S. Pat. Nos. 4,747,879 and 5,098,285 disclose generally a complete system, and the disclosures of those references are incorporated herein by reference.

The raw meal line 13 debouches into an ascending exhaust gas pipeline 15 of the rotary tubular kiln 16 which forms a first portion of the calcinator. The raw meal line 14 debouches into a tertiary air duct 17 forming a second portion of the calcinator that is supplied with tertiary air from the clinker cooler 54 by means of the tertiary air line 18, which comes from the clinker cooler connected downstream from the rotary tubular kiln 16. Approximately in the region of the raw meal introduction, the rotary kiln ascending exhaust gas line 15 is provided with a fuel supply 19 at a first combustion point, and the tertiary air duct 17 is provided with a fuel supply 20 at a second combustion point. The cement raw meal calcinated (de-acidified) in the calcination stage is separated from the hot exhaust gas stream 10 in the cyclone 21, and is introduced, as high-grade (e.g. 95%) calcinated cement raw meal 22, into the rotary tubular kiln 16, in whose sintering zone it is burned to form cement clinkers.

Both the fuel 19 introduced into the rotary kiln exhaust gas ascending line 15 and also the fuel 20 introduced into the tertiary air duct 17, which may each be, for example, coal dust, are burned sub-stoichiometrically, i.e. with a deficiency of oxygen, for the purpose of forming a respective CO-containing reduction zone in the form of CO gas strands 23 and 24 connecting upward from the fuel entrances, the strands being indicated schematically in the drawing by left hatching or, respectively, right hatching. In these reduction zones, the $NO_x$ coming essentially from the rotary kiln firing (first combustion point), as well as the fuel $NO_x$ coming essentially from the second combustion point 20, is reduced, that is, is made harmless by decomposition, so that the $NO_x$ emission of the exhaust gas 10 of the calcination stage is minimized. The exhaust gases of the combustion points 19 and 20 of the calcination stage are combined downstream of the combustion points, and they form the ascending branch 25 of the calcinator, with diversion of the gas-solid material suspension into a descending pipeline branch 26 that leads to the cyclone 21. However, it would also be possible to keep the exhaust gas lines with the combustion points 19 and 20 separate, and, using both exhaust gas lines, to operate a two-line cyclone suspension gas preheating installation, whereby both calcinators would then be connected with a tertiary air branch line 28.

Seen from the combustion points 19 and 20 downstream from the flow of the suspension, combustion air 27 is introduced into the suspension—according to the graphic exemplary embodiment, into the ascending pipeline branch 25 of the calcinator—in order to burn the remainder of the CO strands 23, 24 or, respectively, the excess CO, as well as other fuel components not required for the $NO_x$ reduction, this introduction taking place according to the invention via a branch line 28 that branches off from the tertiary air line 18 coming from the clinker cooler. Additional tertiary air branch lines 28a etc. can also be present that, as shown in broken lines in the drawing, open into the ascending pipeline branch 25 of the calcinator at points downstream from the flow. Of the tertiary air 29 coming from the clinker cooler, such a quantity of air 27 is branched off for the burning of the remainder of the CO strands 23, 24 that the fuel 20 that would burn in the tertiary air duct 17 (second calcination portion) with an excess of oxygen if the tertiary air were not branched off, i.e., with the overall tertiary air 29, burns with a deficiency of oxygen given branched-off tertiary air 27 (at combustion point 20). The quantity of branched-off tertiary air 27 can thus amount to approximately 10 to 50% of the overall tertiary air quantity 29.

It is again to be emphasized that the heated raw meal 13 or, respectively, 14 introduced into the calcination stage approximately in the area of the combustion points 19 or, respectively, 20 acts as a catalyst for the NO, decomposition reactions.

As can also be learned from the drawing, in the calcination stage, in the area of the diversion of the ascending pipeline branch 25 by approximately 180° into the descending pipeline branch 26, there can be arranged another turbulence chamber or, respectively, mixing chamber 30 for the internal mixing of the gas-raw meal-fuel suspension, ensuring with certainty the residual burning of CO gas strands that may be present, as well as, if warranted, other fuel components that may still be present. The mixing chamber 30 can for example comprise an upper tangential suspension entry, as well as a central lower delivery opening; however, it can also comprise a tangential entrance and a tangential exit.

In order to control the division of the tertiary air 29 to the tertiary air channel 17 as well as to the branch line 28 in the desired ratio, actuating elements, such as flaps 31, 32, etc., can also be arranged in the line 17 or, respectively, in the branch line 28, 28a.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A method for thermal treatment of mealy raw materials, in particular in the manufacturing of cement clinkers from raw meal, comprising the steps:

thermally treating raw meal in a burning process by pre-heating the raw material in a cyclone suspension gas pre-heating system having a series of cyclones, calcinating the preheated material in a gas-solid material suspension within a calcinator having an ascending branch and a descending branch, sintering the calcinated material in a rotary kiln which produces an exhaust gas stream directed into a rotary kiln exhaust gas line, and cooling the sintered material in a clinker cooler with an outgoing air stream directed into a cooler outgoing air line, using the exhaust gas stream from the rotary kiln and the outgoing air stream of the clinker cooler in the calcinator, supplied with fuel, for the calcination of the raw meal, diverting the gas-solid material suspension in the calcinator and introducing said suspension into a lowest cyclone of the cyclone suspension gas pre-heating system for the purpose of separating the calcinated material from the gas stream, directing the rotary kiln exhaust gas line into a first portion of the calcinator, directing the cooler outgoing air line into a separate, second portion of the calcinator, introducing fuel and the preheated raw material into the first and second portions of the calcinator at respective combustion points, burning the fuel in the first and second portions of the calcinator sub-stoichiometrically to form CO strands for the reduction of $NO_x$ both in the first portion of the calcinator and in the second portion of the calcinator, introducing additional combustion air into the calcinator downstream of the point of introduction of the fuel in the first and second portions of the calcinator and therewith burning a remainder of the CO strands.

2. A method according to claim 1, including the steps of combining the CO strands from the first potion of the calcinator with the CO strands from the second portion of the calcinator, downstream of the points of introduction of the fuel in the first and second portions of the calcinator and introducing additional air from said clinker cooler as said additional combustion air.

3. A method according to claim 2, comprising the steps of diverting a sufficient amount of air from said clinker cooler from said second portion of the calcinator such that said fuel in the calcinator bums sub-stoichiometrically and introducing a sufficient amount of air from said clinker cooler downstream of said second portion of the calcinator such that said further combustion occurs at least stoichiometrically.

4. A method according to claim 3, wherein the quantity of diverted air amounts to approximately 10 to 50% of the overall clinker cooler air.

5. A method according to claim 1, including the step of introducing heated raw meal into both the rotary kiln exhaust gas line and also into the cooler outgoing air line as a catalyst for the $NO_x$ decomposition reactions, approximately in the area of the respective combustion points.

6. A method according to claim 1, wherein an air ratio $\lambda$ for the sub-stoichiometric fuel combustion in the rotary kiln exhaust gas line is smaller than in the cooler outgoing air line; namely, at the first-named combustion point it lies in a range from approximately 0.1 to 0.7, and at the second-named combustion point it lies in a range from approximately 0.5 to 1.0.

* * * * *